(12) United States Patent
Mitchell et al.

(10) Patent No.: US 6,992,830 B1
(45) Date of Patent: Jan. 31, 2006

(54) PROJECTION DISPLAY HAVING AN ANGLE-SELECTIVE COATING FOR ENHANCED IMAGE CONTRAST, AND METHOD FOR ENHANCING IMAGE CONTRAST

(75) Inventors: Daniel Bruce Mitchell, Port McNicoll (CA); John William Bowron, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/831,078

(22) Filed: Apr. 22, 2004

(51) Int. Cl.
*G02B 27/10* (2006.01)
*G02B 27/12* (2006.01)
*G02B 27/00* (2006.01)
*G02B 26/08* (2006.01)
*G03B 21/14* (2006.01)

(52) U.S. Cl. .............. 359/618; 359/298; 359/640; 359/601; 353/20; 353/33; 353/81

(58) Field of Classification Search ............... 359/618, 359/625, 634, 237, 290, 638–640, 601, 613, 359/229, 298; 353/20, 33, 34, 81; 52/200
See application file for complete search history.

(56) References Cited

U.S. PATENT DOCUMENTS

| 4,745,416 A | 5/1988 | Horihata ............ 347/259 |
|---|---|---|
| 4,969,730 A | 11/1990 | van den Brandt ......... 353/31 |
| 5,193,028 A | 3/1993 | Noguchi .............. 359/581 |
| 5,452,024 A | 9/1995 | Sampsel .............. 348/755 |
| 6,014,845 A * | 1/2000 | Jain et al. ............ 52/200 |
| 6,023,365 A | 2/2000 | McDonald ............ 359/291 |
| 6,078,421 A | 6/2000 | Davey et al. .......... 359/237 |
| 6,609,798 B1 | 8/2003 | Milinusic et al. ........ 353/98 |
| 6,758,565 B1 * | 7/2004 | Cobb et al. ............ 353/34 |

* cited by examiner

*Primary Examiner*—Georgia Epps
*Assistant Examiner*—Jack Dinh
(74) *Attorney, Agent, or Firm*—William C. Schubert; Karl A. Vick (57) ABSTRACT

A projection display includes a light source, a spatial light modulator that receives a light from the light source, and an angle-selective coating disposed to receive the light beam from the spatial light modulator. The angle-selective coating is oriented at a non-zero inclination angle to the light beam. The angle-selective coating has a higher transmission for light that is incident upon the angle-selective coating at an incidence angle within an acceptance-angle deviation from a design incidence angle, than for light that is incident upon the angle-selective coating at an incidence angle greater than the acceptance-angle deviation from the design incidence angle. The projection display preferably includes a TIR (total internal reflection) prism disposed to reflect a light beam from the light source to the spatial light modulator, and to receive the light beam from the spatial light modulator. The angle-selective coating is preferably buried within the TIR prism.

21 Claims, 6 Drawing Sheets

PROJECTION DISPLAY HAVING AN ANGLE-SELECTIVE COATING FOR ENHANCED IMAGE CONTRAST, AND METHOD FOR ENHANCING IMAGE CONTRAST

This invention relates to enhancing the image contrast of a projection display and, more particularly, to a digital projection display in which light from a light source is reflected from a spatial light modulator for projection.

BACKGROUND OF THE INVENTION

Digital projection displays (also known as digital light projection or DLP systems) are in widespread use. In one form of such a system, a high-angle incident light beam from a light source is reflected from a TIR (total internal reflection) face of a TIR prism. (All angles discussed herein are measured from the normal or perpendicular line to a plane.) The reflected light is incident upon a spatial light modulator such as a digital micromirror device (DMD, sometimes called a digital mirror device). The spatial light modulator controllably reflects individual pixels of the incident light beam back into the TIR prism, through the TIR face at a sufficiently low angle that the light passes through the TIR face, and to a projection lens system to form the projected image. The light that is not to form a part of the projected image is reflected in another direction by the spatial light modulator. Digital light projection systems are of increasing interest because they are based upon digital storage of the image, and because they may be made highly compact.

As with all projectors, the image contrast achieved by the digital projection display is an important consideration. The image contrast is a subjective assessment of how strongly the image of interest (usually a darker area) differs from its background (usually a lighter area). If the image contrast is low, the image will not be clearly defined relative to the background, and will appear weak or diluted. If the image contrast is high, the image will stand out clearly against the background. The image contrast may be quantitatively expressed in terms of a "contrast ratio", the ratio of the maximum to the minimum luminance in all or a selected portion of the field of view.

Most digital light projection systems have complex light paths and depend upon multiple light reflections from the digital micromirror device, the TIR prism, and a compact optical system. Consequently, there are several mechanisms by which the contrast ratio is degraded. Off-state light reaching the image, ghost images, and stray light all increase the amount of light that reaches areas of the projected image that ideally are dark (i.e., have no light). The result is that the image contrast and the contrast ratio are degraded, and the image is visually less pleasing to the observer.

There is a continuing need to improve image contrast and the contrast ratio of projectors generally, but particularly for digital projection displays. The approach adopted must be consistent with the otherwise-compact structure of the digital projection display. The present invention fulfills this need, and further provides related advantages.

SUMMARY OF THE INVENTION

The present invention provides a projection display, particularly a digital projection display, with improved image contrast as compared with that experienced in the absence of the present approach. The improved image contrast is achieved without significantly altering the operation and overall structure of the digital projection display, so that the present approach is compatible with digital projection display technology generally and with other advancements in the technology such as improvements to the digital micromirror device (DMD). The present approach allows the digital projection display to retain its compact size.

In accordance with an embodiment of the invention, a projection display comprises a light source, a spatial light modulator, and a TIR (total internal reflection) prism that reflects a source light beam from the light source to the spatial light modulator, and then allows the light beam reflected from the spatial light modulator to pass therethrough. There is an angle-selective coating through which the light beam passes after it leaves the TIR prism. The angle-selective coating has a higher transmission for light that is incident upon the angle-selective coating at an incidence angle within an acceptance-angle deviation from a design incidence angle than for light that is incident upon the angle-selective coating at an incidence angle greater than the acceptance-angle deviation from the design incidence angle. For example, the design incidence angle may be from about 10 to about 25 degrees of perpendicular to the angle-selective coating, and the acceptance-angle deviation is less than about 12 degrees.

The light source is preferably a polychromatic visible light source such as a compact arc lamp. The spatial light modulator is preferably a digital micromirror device (DMD). The angle-selective coating is preferably a multi-layer stack having a number of layers whose compositions and thicknesses are selected to produce the desired optical performance.

More specifically, a projection display comprises a light source, a spatial light modulator, and a TIR prism that reflects a source light beam from the light source to the spatial light modulator, and then allows light reflected from the spatial light modulator to pass therethrough. The TIR prism comprises a first light-transparent body having a first-body entry face through which the source light beam enters the TIR prism, a first-body TIR face from which the source light beam reflects, and a first-body modulator face through which the source light beam reflected from the first-body TIR face passes to be incident upon the spatial light modulator. The light beam reflected from the spatial light modulator passes through the first-body modulator face and the first-body TIR face. The TIR prism further comprises a second light-transparent body having a second-body face facing the first-body TIR face but separated from the first-body TIR face by an air gap, and a second-body inclined face that is preferably inclined by a non-zero inclination angle to the light beam that passes through the second-body face and is incident upon the second-body inclined face. There is an angle-selective coating at the second-body inclined face. The angle-selective coating has a higher transmission for light that is incident upon the second-body inclined face at an incidence angle within a acceptance-angle deviation from a design incidence angle than for light that is incident upon the angle-selective coating at an incidence angle greater than the acceptance-angle deviation from the design incidence angle. The TIR prism further comprises a third light-transparent body having a third-body inclined face joined to the second-body inclined face with the angle-selective coating therebetween. Other compatible features discussed herein may be used with this embodiment.

More generally, a projection display comprises a light source, a spatial light modulator that receives a light beam from the light source, and an angle-selective coating disposed to receive the light beam from the spatial light modulator. The angle-selective coating is preferably oriented at a non-zero inclination angle to the light beam. The angle-selective coating has a higher transmission for light that is incident upon the angle-selective coating at an incidence angle within an acceptance-angle deviation from a design incidence angle than for light that is incident upon the angle-selective coating at an incidence angle greater than the acceptance-angle deviation from the design incidence angle. The angle-selective coating may be buried within a TIR prism that is part of the projection display, or positioned exteriorly to any other of the optical component but between the spatial light modulator and the projected image. Other compatible features discussed herein may be used with this embodiment.

A method for enhancing a contrast of a projection display comprises the steps of providing a light source, providing a spatial light modulator that receives a light beam from the light source, and disposing an angle-selective coating to receive the light beam from the spatial light modulator. The angle-selective coating is preferably oriented at a non-zero inclination angle to the light beam. The angle-selective coating has a higher transmission for light that is incident upon the angle-selective coating at an incidence angle within an acceptance-angle deviation from a design incidence angle than for light that is incident upon the angle-selective coating at an incidence angle greater than the acceptance-angle deviation from the design incidence angle. Other compatible features discussed herein may be used with this embodiment.

The present approach is based upon a recognition that the light that reaches the low-intensity part of the projected image, which ideally has no or little light reaching it, finds its way from the spatial light modulator to the projected image by some undesired light path. Light beams on the undesired light paths enter the projection optics at an angle different from the light beams that form the dark portion of the projected image. The present approach uses an angle-selective coating to prevent at least some of the undesired light from reaching the projected image. Angle-selective coatings may be designed to selectively reflect and/or selectively transmit light of various angles of incidence and wavelengths. In the present approach, the angle-selective coating is positioned to intercept the light beams that have been modulated by the spatial light modulator. The light beams traveling along the undesired light paths are attenuated because the angle-selective coating is designed to attenuate light beams at all but the direct light paths of interest. The result is that the intensities of the light beams on the undesired light paths are reduced, so that the dark portion of the image is darker than it would otherwise be in the presence of the undesired light beams. This produces higher image contrast and a greater contrast ratio. The angle-selective coatings are very thin, and their presence, together with their supporting structure, does not substantially increase the length of the projection display.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
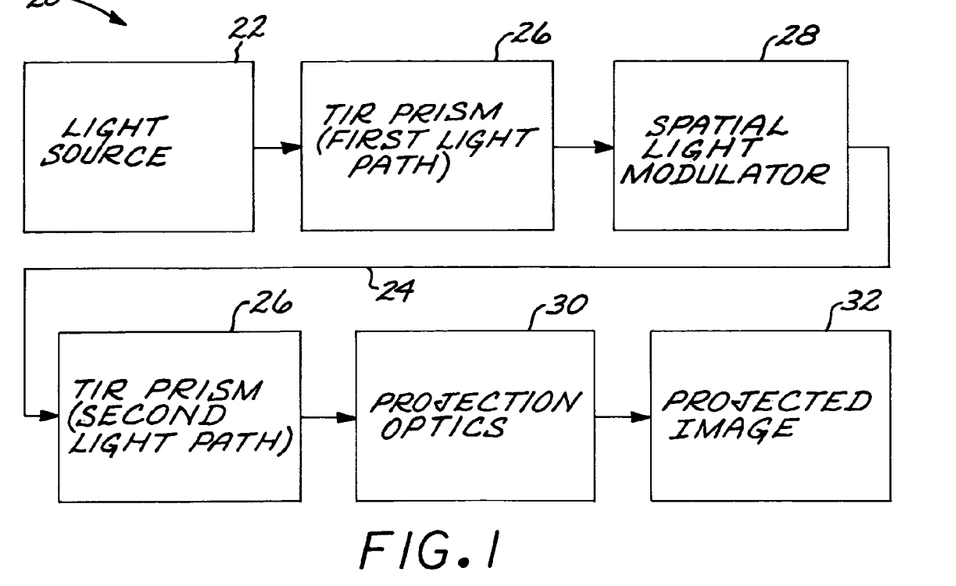
FIG. 1 is a block diagram of a digital projection display.
Figure 2A:
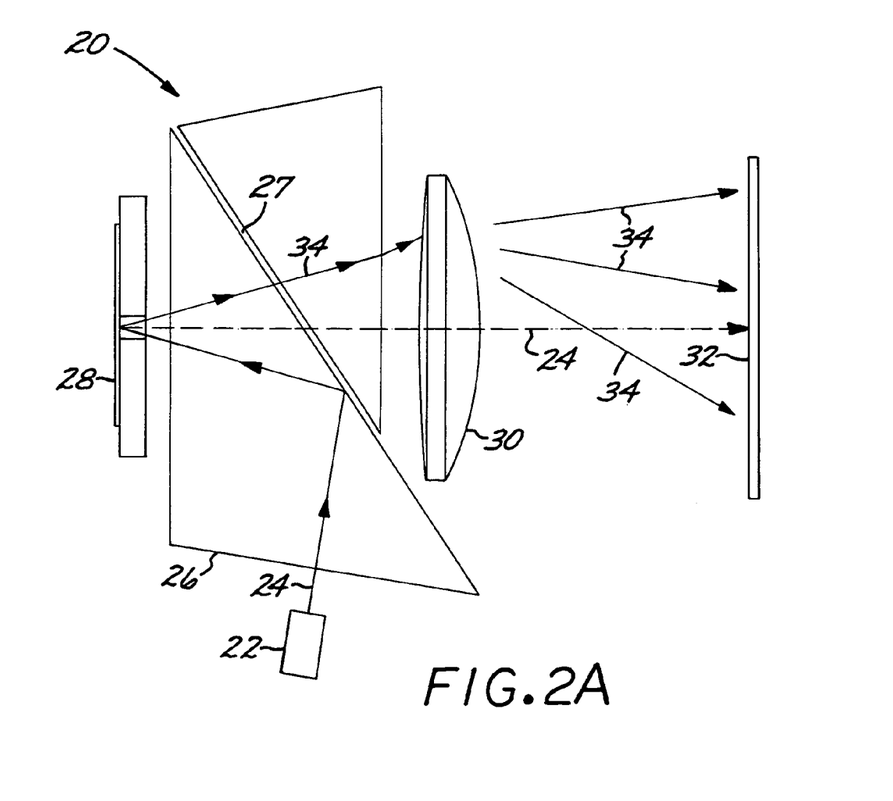
FIGS. 2A–2C are schematic elevational views of digital projection displays that are not within the scope of the present invention, illustrating the direct light path and several undesired light paths.
Figure 2B:
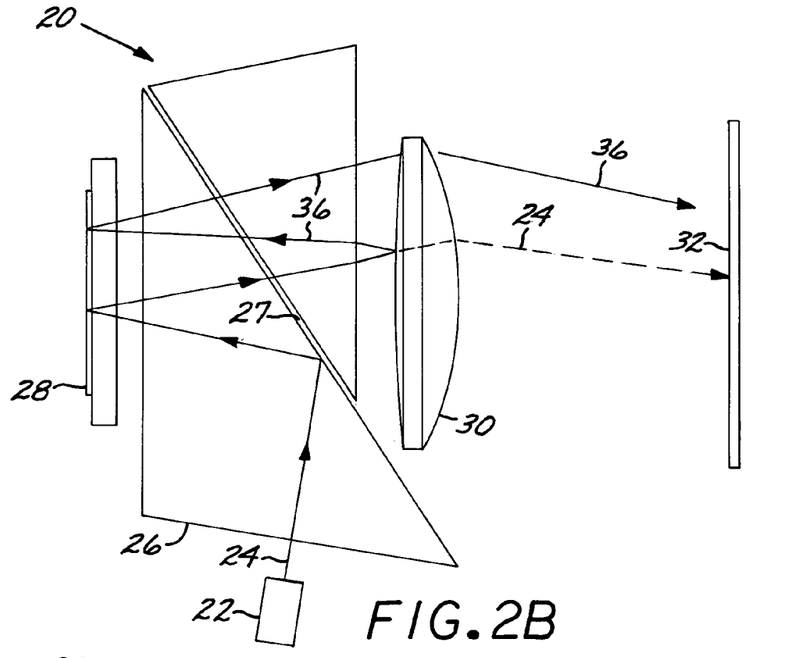
Figure 2C:
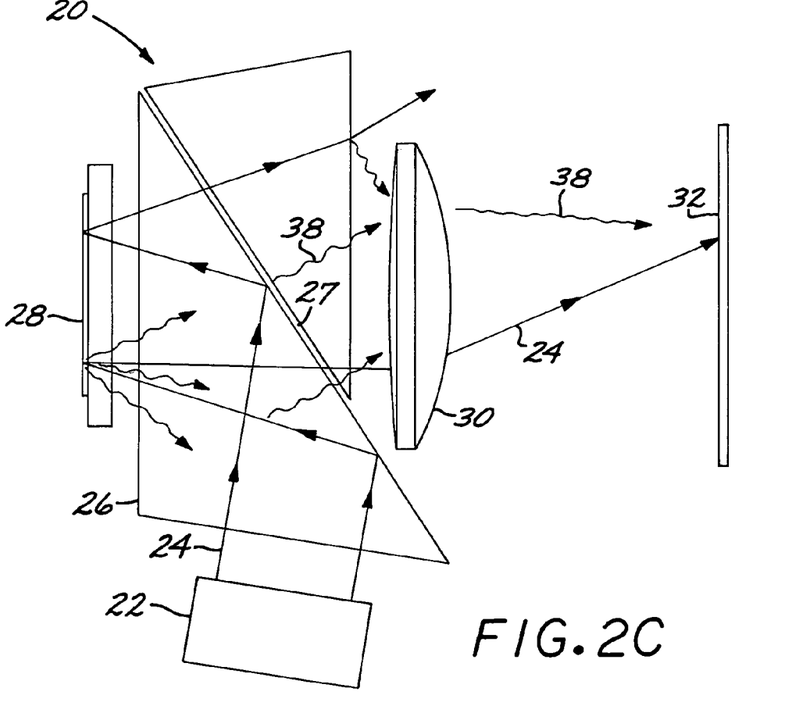

FIG. 1 is a block diagram of one form of a digital projection display 20, and FIG. 2 depicts the arrangement of the elements of the digital projection display. Light, typically polychromatic visible light, is produced by a light source 22. A light beam 24 travels through a TIR (total internal reflection) prism 26 on a first light path such that the light beam 24 is reflected at an air gap 27 of the TIR prism 26. The light beam 24 is then incident upon a spatial light modulator 28. The spatial light modulator 28, which is preferably a digital micromirror device (DMD), modulates the light beam 24 to define an image therein. The digital micromirror device has an array of small mirrors, each defining one pixel of the image, that may be controllably set either to reflect the incident light in the desired direction for forming the light part of the projected image, or set to reflect the incident light away from the desired direction to form the dark part of the projected image. The image-forming portion of the light beam 24 passes through the TIR prism 26 on a second light path at an angle of incidence such that the light beam 24 travels across the air gap 27 of the TIR prism 26. (All angles discussed herein are measured from the normal or perpendicular line to the surface under discussion.) The light beam 24 then leaves the TIR prism 26, and passes through projection optics 30 to form a projected image 32. Digital projection displays 20 of this type are known in the art, except for the modifications discussed herein.

Ideally, no light from the light source 22 reaches the projected image 32 in the areas which are to be dark. In practice, however, various types of imperfections in the digital projection display 20 degrade its performance so that some light reaches the projected image 32 in the areas that are to be dark. Three types of such imperfections are illustrated in FIGS. 2A–2C. In the first, depicted in FIG. 2A, the micromirrors of the DMD that form the spatial light modulator 28 produce off-state light that reaches the projected image 32 along undesired beam paths 34. In the second, depicted in FIG. 2B, ghost images are formed by light that reflects multiple times from parts of the system such as imperfect anti-reflective coatings on the projection optics 30 and then again from the DMD to the projected image 32, along undesired beam paths 36. In the third, depicted in FIG. 2C, stray light is scattered by imperfections inside and at the surfaces of the glass elements of the digital projection display 20 along undesired beam paths 38. The light on each of these undesired beam paths 34, 36, and 38 produces light in areas that are desirably dark in projected image 32, resulting in reduced contrast and a reduced contrast ratio between the dark and light areas of the projected image.

Figure 3:
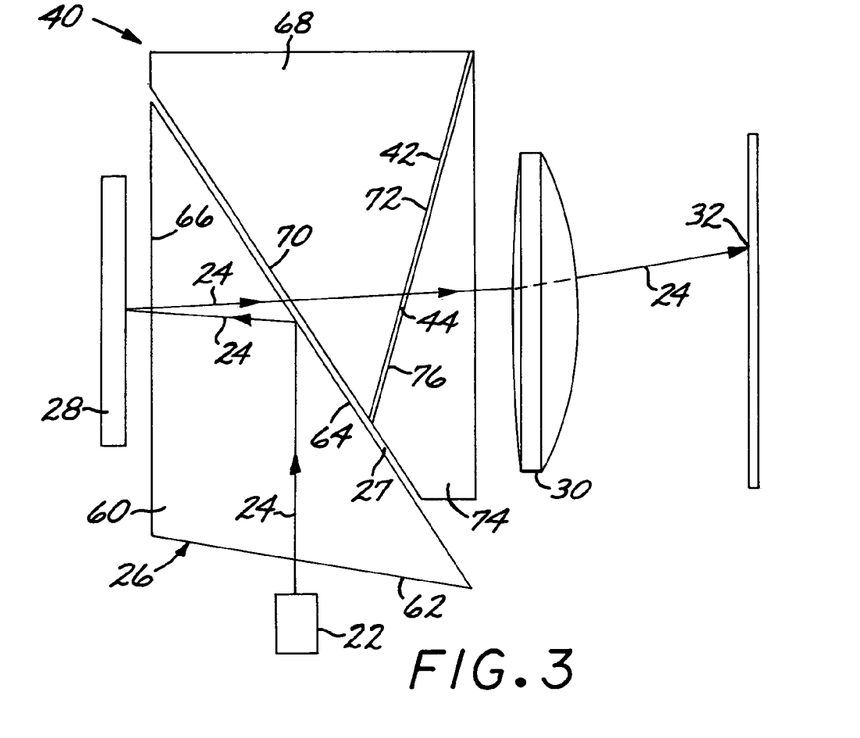
FIG. 3 is a schematic elevational view of the digital projection display in accordance with the present approach using a modified TIR prism with a buried angle-selective coating.

FIG. 3 illustrates an improved digital projection display 40 that reduces the undesired light reaching the projected image 32, thereby improving its contrast. Some of the elements of FIG. 3 are the same as those of FIGS. 1–2. The same reference numerals are used in FIG. 3 as appropriate, and the prior description is incorporated here. In the approach of FIG. 3, a buried interface 42 is present within the TIR prism 26, at a location so as to intercept the light beam 24 after it reflects from the spatial light modulator 28. "Buried" means that the interface 42 is completely within the TIR prism 26, and is not at a separate, freestanding location. (Non-buried interfaces will be discussed in relation to some subsequently described embodiments.) The buried interface 42 is preferably inclined by a non-zero inclination angle to the light beam 24 that is incident thereon. That is, the light beam 24 is not perpendicular to the surface of the buried interface 42. In a preferred example, the light beam 24 is incident on the buried interface 42 and a multilayer angle-selective coating 44 at an angle of 10–25 degrees (measured from the line perpendicular to the surface of the buried interface 42). The present approach is operable when the angle of incidence is less than 10 degrees or more than 25 degrees, but the performance is not as good. If the angle of incidence is less than 10 degrees, the strong angle-selectivity effects are reduced because of the geometrical relationships. If the angle of incidence is greater than 25 degrees, any increasing number of layers are required in the angle-selective coating 44, and the angle-selective coating becomes more difficult to produce.

Figure 4:
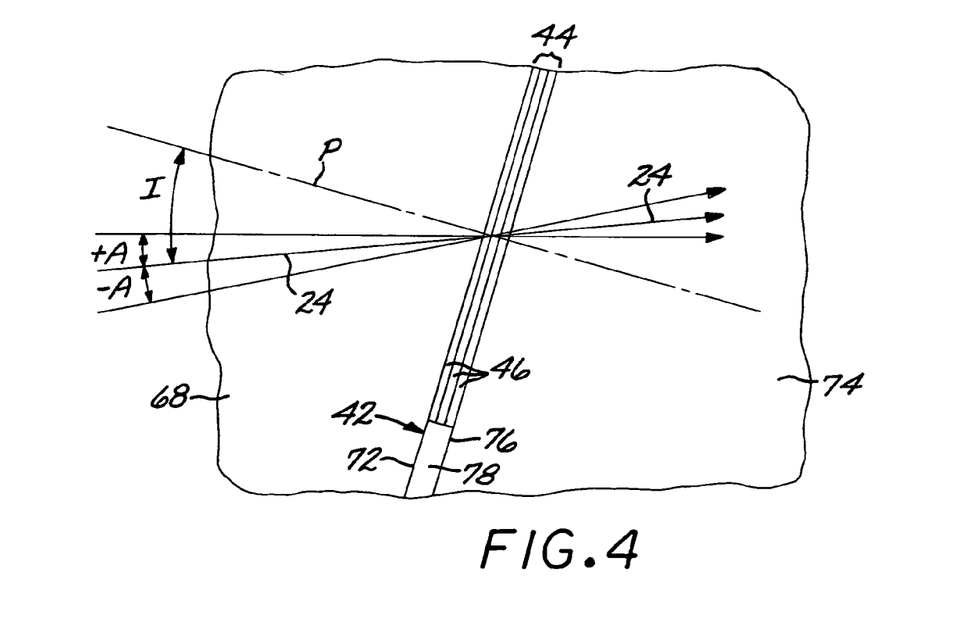
FIG. 4 is a schematic enlargement of the angle-selective coating and the relevant geometry of the incident light beam.

The angle-selective coating 44 is deposited upon either one of the transparent pieces that define the buried interface 42. The angle-selective coating 44 is illustrated in greater detail in FIG. 4. The angle-selective coating 44 is preferably formed as a plurality of layers 46 (only three of which are illustrated) that are each transparent to the light desired to produce the projected image 32. However, because of the ordering and the thickness of the layers, light at certain angles and wavelengths is reflected. In this case, the layers 46 are selected such that the angle-selective coating 44 has a higher transmission for light that is incident upon the angle-selective coating at an incidence angle within an acceptance-angle A deviation from a design incidence angle I, than for light that is incident upon the angle-selective coating at an incidence angle greater than the acceptance-angle deviation from the design incidence angle. In a typical case, the design incidence angle I is from about 10 to about 25 degrees of a perpendicular line P to the angle-selective coating 44.

The angle-selective coating 44 is custom designed for each application, such as the present application. Design programs that are normally used to design wavelength-selective coatings may be adapted for use in designing angle-selective coatings. Such programs used to design wavelength-selective coatings are readily available and widely used, and for example include the commercially available Filmstar$^R$, FilmWizard, and TF Calc programs. The deposition of the angle-selective coating 44 on the interface 42 is accomplished by any appropriate deposition technique, with examples being chemical vapor deposition (CVD), physical vapor deposition (PVD), or sputtering.

Figure 5:
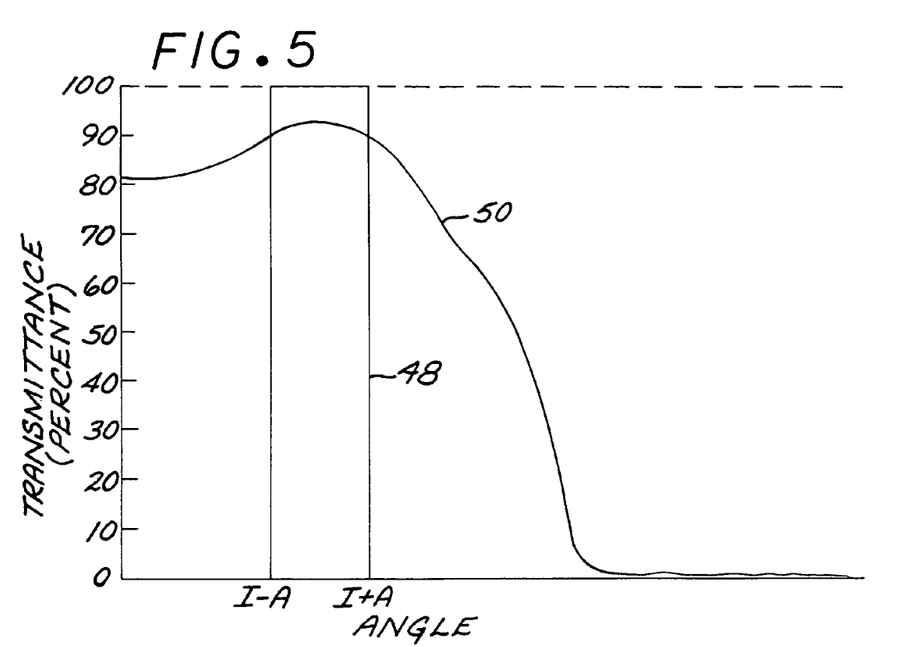
FIG. 5 is a schematic graphical depiction of ideal and actual light transmittance versus angle for an angle-selective coating.

An angle-selective coating 44 was designed and deposited using these approaches, with the incidence angle I of 26 degrees and the value of A about 6 degrees, and for a wavelength of light of 450–650 nanometers. The angle-selective coating 44 had 81 layers of various thicknesses, alternating between layers of aluminum oxide and layers of magnesium fluoride. FIG. 5 illustrates the performance of the angle-selective coating 44, for both an ideal performance 48 and an actual performance 50. Ideally, the angle-selective coating 44 has 100 percent transmittance at angle I and for all angles from I–A to I+A. For all other angles, the transmittance is ideally zero. In practice, there is typically a deviation from the ideal performance, as seen in the actual performance 50. The performance of the angle-selective coating 44 typically approaches the ideal performance 48 more closely as the number of layers 46 increases, with a corresponding increasing manufacturing cost. Additionally, FIG. 5 illustrates the performance of the angle-selective coating 44 for a single wavelength of light, and the performance varies as a function of wavelength.

Thus, in the ideal case, light incident upon the angle-selective filter 44 at any angle less than I–A or greater than I+A is reflected away, in a direction other than back to the spatial light modulator 28 as long as the angle I is nonzero. This approach is effective for preventing light traveling upon undesired beam paths 34, 36, and 38 from reaching the projected image 32, as long as these beam paths are at angles of less than I–A or greater than I+A. The regions of the projected image 32 that are desirably dark thus remain darker than they would be if the undesired beam paths 34, 36, and/or 38 reached the projected image 32.

The present approach does not achieve perfect results, because of the departure from ideal performance of the angle-selective coating, as depicted in the actual performance curve 50 of FIG. 5. Additionally, some of the undesired beam paths may be within the range I–A to I+A, and therefore reach the projected image 32. On the whole, however, the present approach largely solves the problem of off-state undesired beam paths 34, and achieves a partial solution for the ghost-image indirect beam paths 36 and the stray light beam paths 38.

The structure of the TIR prism 26 may be described alternatively in a manner that presents more fully its preferred construction. Referring to FIG. 3, the TIR prism 26 includes a first light-transparent body 60 having a first-body entry face 62 through which the source light beam 24 enters the TIR prism 26. There is a first-body TIR face 64 at the air gap 27 from which the source light beam 24 reflects, because it is incident at a sufficiently high angle of incidence that it experiences total internal reflection. The source light beam 24 reflected from the first-body TIR face 64 passes through a first-body modulator face 66 to be incident upon the spatial light modulator 28. The light beam 24 reflected from the spatial light modulator 28 passes through the first-body modulator face 66 and through the first-body TIR face 64, but at a sufficiently small angle of incidence that it is not reflected from the first-body TIR face 64.

The TIR prism 26 further includes a second light-transparent body 68 having a second-body face 70 facing the first-body TIR face 64 but separated from the first-body TIR face 64 by the air gap 27. The second light-transparent body 68 also has a second-body inclined face 72 that is preferably inclined by a non-zero inclination angle to the light beam that passes through the second-body face 70 and is incident upon the second-body inclined face 72. The angle-selective coating 44 is deposited upon the second-body inclined face 72, which thereby serves as one side of the buried interface 42 in this embodiment.

The TIR prism 26 further includes a third light-transparent body 74 having a third-body inclined face 76 joined to the second-body inclined face 72 with the angle-selective coating 44 therebetween, typically with a layer 78 of optical cement. (The angle-selective coating may equivalently be deposited upon the third-body inclined face 76 rather than the second-body inclined face 72.) That is, the space between the third-body inclined face 76 and the second-body inclined face 72 is filled with the layer 78 of optical cement and the angle-selective coating 44. This structure is distinct from the air gap 27 resulting from the intentional empty spacing between the first-body TIR face 64 and the second-body face 70.

Figure 6:
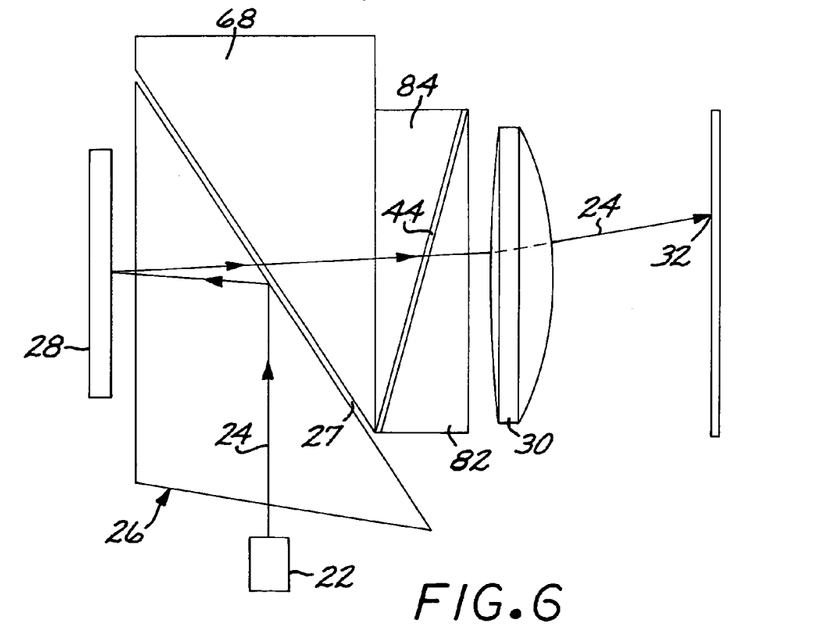
FIG. 6 is a schematic elevational view of the digital projection display with a stand-alone angle-selective coating.

The embodiment of FIG. 3 illustrates the preferred form wherein the angle-selective coating 44 is buried inside the TIR prism 26. However, the angle-selective coating 44 may be on a freestanding substrate that is not a part of the TIR prism 26, as illustrated for a digital projection display 80 in FIG. 6. Many of the elements of FIG. 6 are the same as those of FIGS. 1–3. The same reference numerals are used in FIG. 6 as appropriate, and the prior description is incorporated here. In this case, however, the angle-selective coating 44 is deposited upon a transparent body 82, preferably at a non-zero inclination angle to the light beam 24. The angle-selective coating 44 is sandwiched between the transparent body 82 and an intermediate body 84. The intermediate body 84 is joined to the second light transparent body 68. The structure of the angle-selective coating 44 is otherwise as described earlier, which description is incorporated here.

Figure 7:
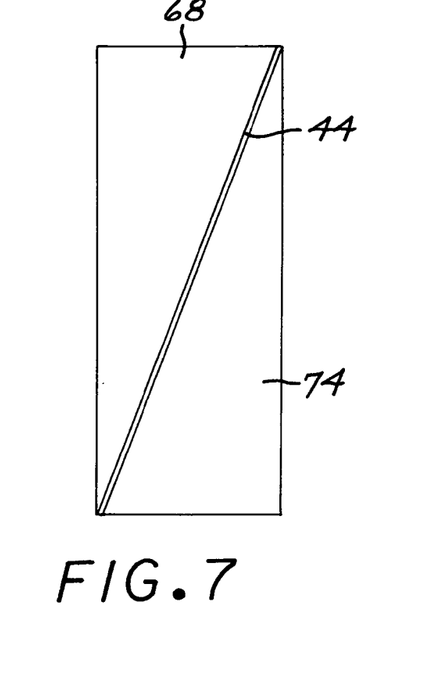
FIGS. 7–10 are schematic elevational views of alternative approaches for providing the angle-selective coating.
Figure 8:
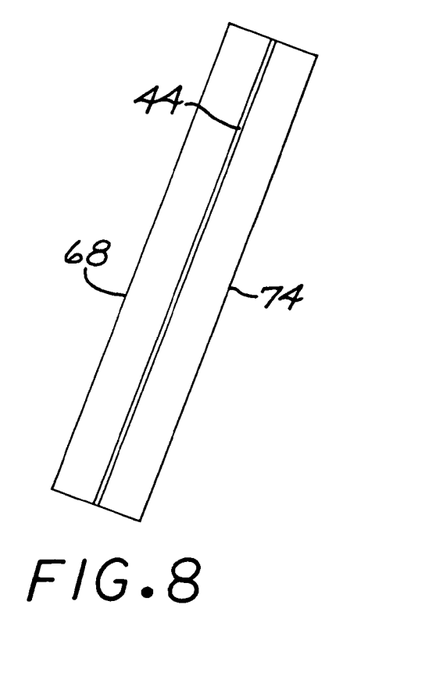
Figure 9:
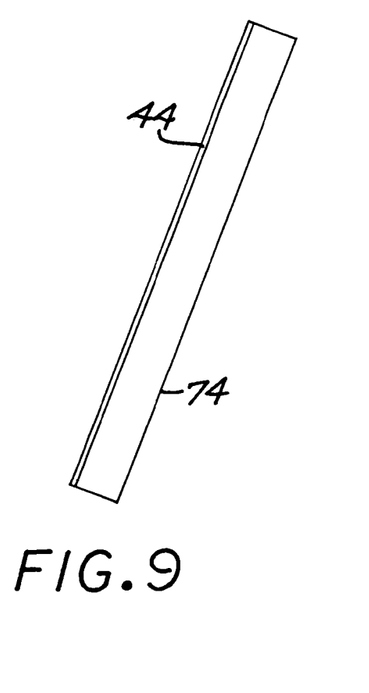
Figure 10:
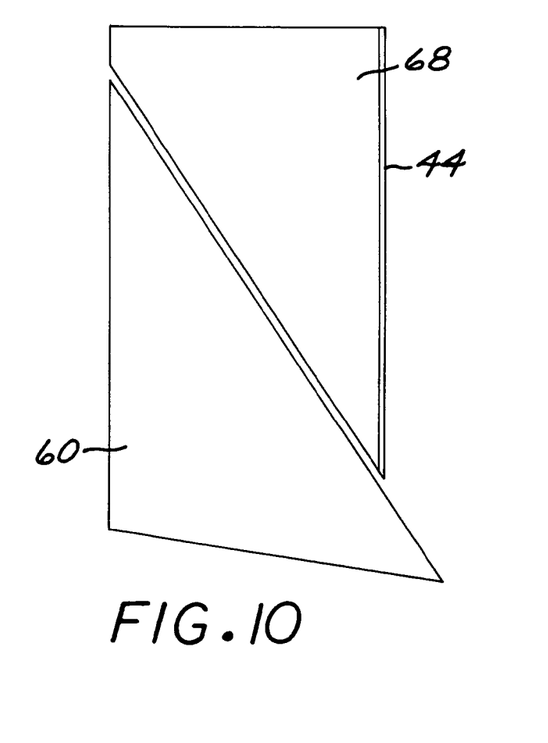

FIGS. 7–10 depict yet other approaches for providing the angle-selective coating 44. In the approaches of FIGS. 7–8, the angle-selective coating 44 is sandwiched between the light-transmitting body 68 and the light-transmitting body 74, which are themselves freestanding. In the approach of FIG. 9, the angle-selective coating 44 is deposited on one surface of the light-transmitting body 74, and there is no additional light-transmitting body (68). In the approach of FIG. 10, the angle-selective coating 44 is deposited on one surface of the light-transmitting body 68, and there is no additional light-transmitting body (74).

Figure 11:
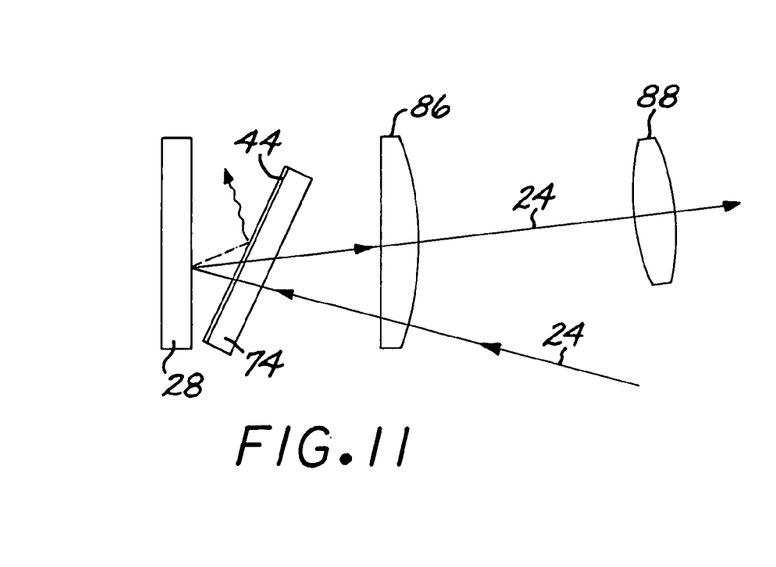
FIG. 11 is a schematic elevational view of a digital projection display that does not use a TIR prism.

The preferred approaches discussed above use a TIR prism 26 to direct the light beam 24 to and from the spatial light modulator 28. In an offset approach illustrated in FIG. 11, a lens 86 directs the light beam 24 to and from the spatial light modulator 28, and there is no TIR prism. In the illustrated embodiment, the angle-selective coating 44 is provided using a structure like that shown in FIG. 9.

Figure 12:
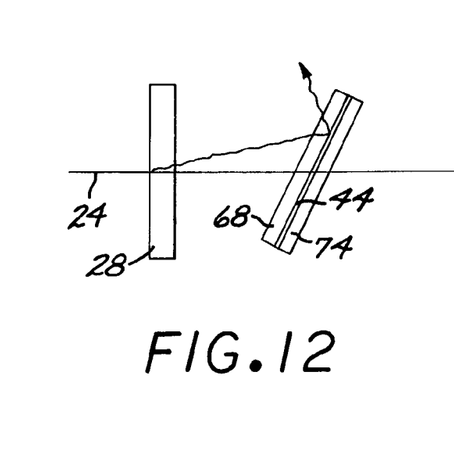
FIG. 12 is a schematic elevational view of a digital projection display using a transmission spatial light modulator.

The preferred approaches discussed above use a digital micromirror device as the spatial light modulator 28. FIG. 12 illustrated the digital projection display 20 using a transmission spatial light modulator 28 and an angle-selective coating 44 of the type shown in FIG. 8, although other operable approaches to providing the angle-selective coating 44 may be used.

Figure 13:
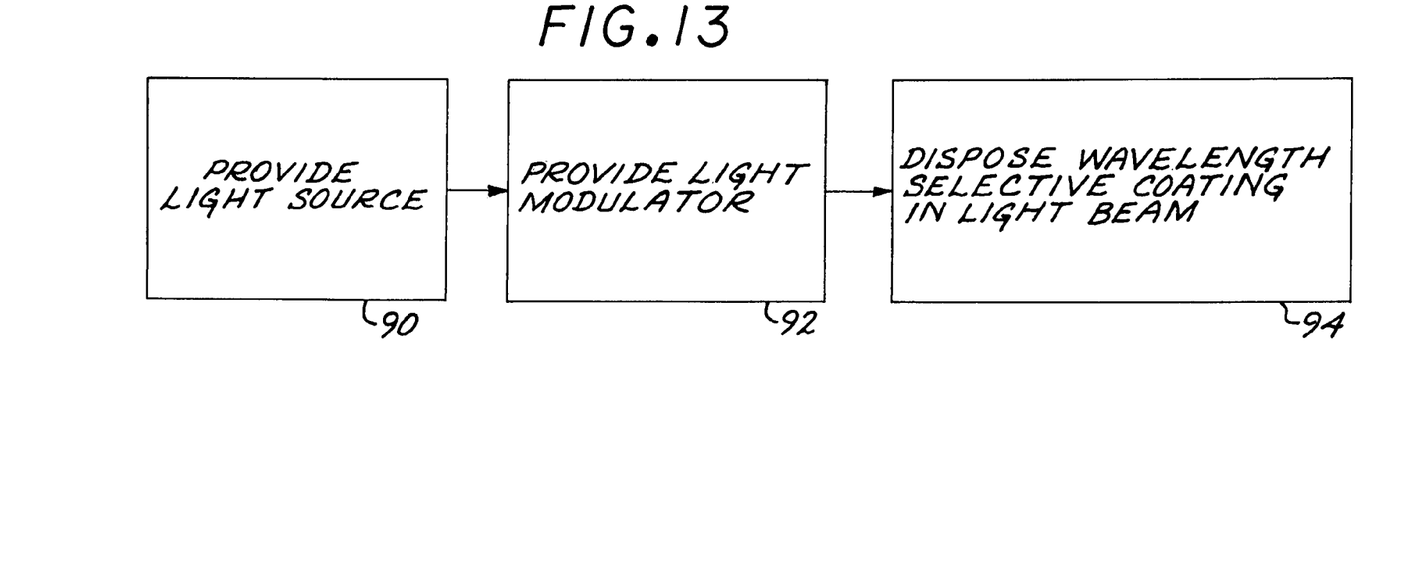
FIG. 13 is a block diagram of a method for practicing an embodiment of the method of the present invention.

FIG. 13 depicts a method for enhancing a contrast of a projection display. The method comprises the steps of providing the light source 22, step 90, and providing the spatial light modulator 28 that receives the light beam 24 from the light source 22. The angle-selective coating 44 is disposed in the light beam 24 to receive the light beam 24 from the spatial light modulator 28. The angle-selective coating 44 is preferably oriented at a non-zero inclination angle to the light beam 24, and has the structure described earlier, which description is incorporated here.

The present approach reduces undesired light that reaches the projected image 32, thereby improving the contrast and contrast ratio of the projection display.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A projection display comprising:
   a light source;
   a spatial light modulator that receives a light beam from the light source; and
   an angle-selective coating disposed to receive the light beam from the spatial light modulator, wherein the angle-selective coating has a higher transmission for light that is incident upon the angle-selective coating at an incidence angle within an acceptance-angle deviation from a design incidence angle than for light that is incident upon the angle-selective coating at an incidence angle greater than the acceptance-angle deviation from the design incidence angle.

2. The projection display of claim 1, further including a TIR prism disposed to reflect a light beam from the light source to the spatial light modulator, and to receive the light beam from the spatial light modulator, and wherein the angle-selective coating is buried within the TIR prism.

3. The projection display of claim 1, wherein the design incidence angle is from about 10 to about 25 degrees of perpendicular to the angle-selective coating.

4. The projection display of claim 1, wherein the acceptance-angle deviation is less than about 12 degrees.

5. The projection display of claim 1, wherein the light source is a polychromatic visible light source.

6. The projection display of claim 1, wherein the spatial light modulator is a digital micromirror device.

7. The projection display of claim 1, wherein the angle-selective coating comprises a multilayer stack.

8. A projection display comprising:
   a light source;
   a spatial light modulator; and
   a TIR prism that reflects a light beam from the light source to the spatial light modulator, and then allows light reflected from the spatial light modulator to pass therethrough; and
   an angle-selective coating through which the light beam passes after it leaves the TIR prism, wherein the angle-selective coating has a higher transmission for light that is incident upon the angle-selective coating at an incidence angle within an acceptance-angle deviation from a design incidence angle than for light that is incident upon the angle-selective coating at an incidence angle greater than the acceptance-angle deviation from the design incidence angle.

9. The projection display of claim 8, wherein the design incidence angle is from about 10 to about 25 degrees of perpendicular to the angle-selective coating.

10. The projection display of claim 8, wherein the acceptance-angle deviation is less than about 12 degrees.

11. The projection display of claim 8, wherein the light source is a polychromatic visible light source.

12. The projection display of claim 8, wherein the spatial light modulator is a digital micromirror device.

13. The projection display of claim 8, wherein the angle-selective coating comprises a multilayer stack.

14. A projection display comprising:
a light source;
a spatial light modulator; and
a TIR prism that reflects a source light beam from the light source to the spatial light modulator, and then allows light reflected from the spatial light modulator to pass therethrough, wherein the TIR prism comprises:
 a first light-transparent body having
  a first-body entry face through which the source light beam enters the TIR prism,
  a first-body TIR face from which the source light beam reflects, and
  a first-body modulator face through which the source light beam reflected from the first-body TIR face passes to be incident upon the spatial light modulator, wherein the light beam reflected from the spatial light modulator passes through the first-body modulator face and the first-body TIR face,
 a second light-transparent body having
  a second-body face facing the first-body TIR face but separated from the fist-body TIR face by an air gap, and
  a second-body inclined face that is inclined by an inclination angle to the light beam that passes through the second-body face and is incident upon the second-body inclined face,
 an angle-selective coating at the second-body inclined face, wherein the angle-selective coating has a higher transmission for light that is incident upon the second-body inclined face at an incidence angle within a acceptance-angle deviation from a design incidence angle than for light that is incident upon the angle-selective coating at an incidence angle greater than the acceptance-angle deviation from the design incidence angle, and
 a third light-transparent body having a third-body inclined face joined to the second-body inclined face with the angle-selective coating therebetween.

15. The projection display of claim 14, wherein the inclination angle is a non-zero inclination angle.

16. The projection display of claim 14, wherein the design incidence angle is from about 10 to about 25 degrees of perpendicular to the angle-selective coating.

17. The projection display of claim 14, wherein the acceptance-angle deviation is less than about 12 degrees.

18. The projection display of claim 14, wherein the light source is a polychromatic visible light source.

19. The projection display of claim 14, wherein the spatial light modulator is a digital micromirror device.

20. The projection display of claim 14, wherein the angle-selective coating comprises a multilayer stack.

21. A method for enhancing a contrast of a projection display, comprising the steps of
providing a light source;
providing a spatial light modulator that receives a light beam from the light source; and
disposing an angle-selective coating to receive the light beam from the spatial light modulator, wherein the angle-selective coating is oriented at an inclination angle to the light beam, and wherein the angle-selective coating has a higher transmission for light that is incident upon the angle-selective coating at an incidence angle within an acceptance-angle deviation from a design incidence angle than for light that is incident upon the angle-selective coating at an incidence angle greater than the acceptance-angle deviation from the design incidence angle.

* * * * *